United States Patent
Issari et al.

(10) Patent No.: US 10,392,543 B2
(45) Date of Patent: Aug. 27, 2019

(54) REACTIVE RESINS AND FORMULATIONS FOR LOW REFRACTIVE INDEX AND LOW DIELECTRIC CONSTANT APPLICATIONS

(71) Applicant: Henkel IP & Holding GmbH, Duesseldorf (DE)

(72) Inventors: Bahram Issari, Glastonbury, CT (US); Wenhua Zhang, Farmington, CT (US); John G. Woods, Farmington, CT (US); Shengqian Kong, Hillsborough, NJ (US); Yayun Liu, Franklin Park, NJ (US); Jiangbo Ouyang, Wallingford, CT (US); Li Kang, Middletown, CT (US)

(73) Assignee: Henkel IP & Holding GmbH, Duesseldorf (DE)

( * ) Notice: Subject to any disclaimer, the term of this patent is extended or adjusted under 35 U.S.C. 154(b) by 0 days.

(21) Appl. No.: 16/178,775

(22) Filed: Nov. 2, 2018

(65) Prior Publication Data
US 2019/0071593 A1    Mar. 7, 2019

Related U.S. Application Data

(63) Continuation of application No. PCT/US2017/030781, filed on May 3, 2017.

(60) Provisional application No. 62/331,488, filed on May 4, 2016.

(51) Int. Cl.
| | |
|---|---|
| *C08G 77/24* | (2006.01) |
| *C09J 183/08* | (2006.01) |
| *C08F 2/46* | (2006.01) |
| *C08L 33/16* | (2006.01) |
| *C08L 71/00* | (2006.01) |
| *C09J 11/06* | (2006.01) |
| *C09J 11/08* | (2006.01) |

(52) U.S. Cl.
CPC ............... *C09J 183/08* (2013.01); *C08F 2/46* (2013.01); *C08G 77/24* (2013.01); *C08L 33/16* (2013.01); *C08L 71/00* (2013.01); *C09J 11/06* (2013.01); *C09J 11/08* (2013.01); *C08L 2312/00* (2013.01)

(58) Field of Classification Search
CPC .......... C08G 77/24; C08G 77/20; C08G 77/70
USPC ........................................................... 528/32
See application file for complete search history.

(56) References Cited

U.S. PATENT DOCUMENTS

| | | | |
|---|---|---|---|
| 6,818,721 B2 * | 11/2004 | Zha ...................... | C08G 77/08 528/12 |
| 6,828,355 B1 | 12/2004 | Chu | |
| 6,984,483 B1 * | 1/2006 | Roscher ................. | C09D 4/00 430/280.1 |
| 7,125,949 B2 | 10/2006 | Jin | |
| 7,396,873 B2 * | 7/2008 | Kuramoto ............... | C03C 17/28 524/284 |
| 2002/0037417 A1 * | 3/2002 | Sato ....................... | C08G 77/24 428/447 |
| 2010/0271699 A1 * | 10/2010 | Chang .................... | C09D 5/006 359/485.01 |
| 2014/0135413 A1 * | 5/2014 | Yoo ........................ | C08L 83/10 522/38 |
| 2018/0094006 A1 * | 4/2018 | Warner .................... | C09D 7/62 |

FOREIGN PATENT DOCUMENTS

| | | |
|---|---|---|
| EP | 0657487 A2 | 6/1995 |
| WO | 2007097835 A2 | 8/2007 |
| WO | 2009048694 A1 | 4/2009 |

\* cited by examiner

*Primary Examiner* — Margaret G Moore
(74) *Attorney, Agent, or Firm* — James E. Piotrowski

(57) ABSTRACT

Disclosed is a highly fluorinated silicone resin and a method for making the same. The silicone resin includes M, T, optionally D and optionally Q type monomers and is cross-linkable. The resin has a fluorine content of at least 55 weight percent and a very low refractive index of less than 1.4. The resin is formed in a one step process and requires use of very specific solvents. Preferably the resin includes a first T type monomer having a fluoroalkane group to provide the fluorine to the resin. Preferably the resin includes a second T type monomer having a (meth)acryloyl function to enable cross-linking. The resin forms an effective liquid optically clear adhesive. The resin can be further combined with highly fluorinated (meth)acrylate monomers or perfluoro polyethers to provide even lower refractive indexes and improved adhesive properties.

20 Claims, 1 Drawing Sheet

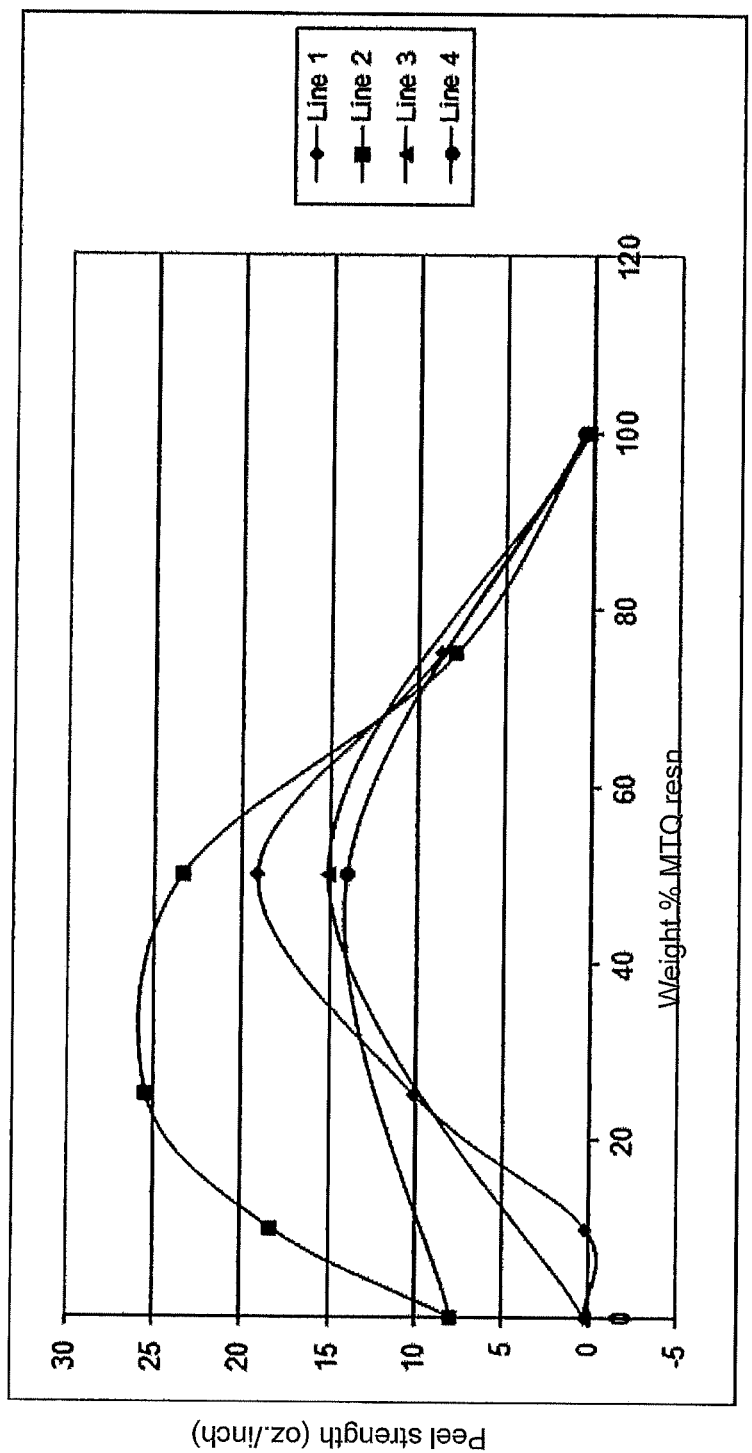

REACTIVE RESINS AND FORMULATIONS FOR LOW REFRACTIVE INDEX AND LOW DIELECTRIC CONSTANT APPLICATIONS

RELATED APPLICATIONS

NONE.

TECHNICAL FIELD

This invention relates generally to liquid optically clear adhesives and more particularly to liquid optically clear adhesives containing highly fluorinated silicone resins and highly fluorinated acrylates that have a very low refractive index.

BACKGROUND OF THE DISCLOSURE

Liquid optically clear adhesives are used in many electronic devices including: in touch sensitive panels, display devices such as computer monitors, mobile phone screens, tablet screens and television screens. The past technology included die-cut double sided film adhesives or optically clear adhesive tapes which were not entirely satisfactory. The advantages of liquid optically clear adhesive (LOCA) include re-workability, adhesion to uneven surfaces, better optical properties, and durability. The use of a LOCA also allows for thinner designs compared to tapes. One of the other past issues with uses of double-sided tapes is the creation of a bezel around the liquid crystal module (LCM), for example a mobile phone screen, caused by the tape. As devices become more complex the desire to enhance the viewable area of a given screen increases such that any change that can reduce the bezel results in a bigger viewing area without increasing the overall size of the screen. In addition, while these tapes are "optically clear" they are not necessarily ideally matched to the refractive index of the other components in the LCM which can reduce brightness, clarity, and the contrast ratio. In addition, use of a tape introduces an air gap between the components in the LCM which can further interfere with a clear display by introducing increased reflected light. The air gap can also allow for condensation to develop between the bonded layers.

Many of the current LOCA utilize silicone-based adhesives as part of their formulations. Often times these silicones are prepared by the known sol/gel processes to form a variety of MTQ type silicone resins. Throughout the present specification and claims the standard short hand definitions of silicone nomenclature will be used. Under these definitions: M type units are monofunctional $R_3SiO$; D type units are difunctional $R_2SiO_2$; T type units are trifunctional $RSiO_3$; and Q type units are tetrafunctional $SiO_4$. These sol/gel prepared silicone resins are often subjected to a second process wherein they are fluorinated to provide enhancements to their properties, including lowering their refractive index. This second process proceeds through reaction of fluoro containing reagents with the residual silanol groups in the sol/gel prepared resin and thus the process is multi-step and the fluorination reactions can be difficult to control. The amount of incorporation of fluorine is hard to control since it depends on the amount of residual silanol groups in the silicone resin.

Another process that has been used to lower the refractive index of adhesives is to include addition of fluorinated acrylate monomers with the adhesive composition to lower their refractive index; however these suffer from a number of issues. The fluorinated acrylate monomers tend to be very volatile and thus one is required to introduce oligomeric or polymeric species into the adhesive formulations to reduce the volatility of that adhesive formulation. The introduction of the oligomeric or polymeric species causes an undesirable increase in the refractive index of the adhesive defeating the purpose of including the fluorinated acrylate monomers. In addition, the use of highly fluorinated acrylates tends to reduce the adhesion value of the adhesive due to the fluorine units in the fluorinated acrylate monomer. Thus, there exists a need to find alternative ways or sources of materials that can be used to lower the refractive index of adhesives, particularly LOCA type adhesives, without reducing the adhesive properties and the other desirable properties of the adhesive.

It is desirable to provide a LOCA that has a very low refractive index, a low viscosity, and high adhesion allowing for use of very thin layers of the adhesive and to provide a thin overall design. It is furthermore desirable to provide a method for formation of highly fluorinated silicone resins in a simplified single step process for use in a LOCA. It is also preferred to produce a highly fluorinated silicone resin that can be radically crosslinked to improve strength and durability. Preferably the LOCA can bond to a variety of substrates and does not exhibit shrinkage, haze or color on curing.

SUMMARY OF THE DISCLOSURE

In general terms, this disclosure provides liquid optically clear adhesive composition that has very low refractive indexes allowing for use in applications such as liquid crystal modules to provide improved screen brightness and clarity. The LOCAs have very high adhesion to a variety of substrates and comprise highly fluorinated silicone resins that can be radically crosslinked and, optionally, combined with highly fluorinated additives, such as highly fluorinated acrylate monomers or perfluoro polyethers. Optional addition of an acrylamide can be used to further improve a variety of properties of the adhesive.

In one embodiment is disclosed A highly fluorinated silicone resin comprising the reaction products of: an M type monomer having a chlorosilane function; a first T type monomer having at least one fluoroalkane group; a second T type monomer having a (meth)acryloyl functional group; optionally, a D type monomer; and optionally, a Q type monomer; said silicone resin having a fluorine content of at least 55 weight percent based on the total weight, a refractive index at 25° C. of less than 1.4, and an uncured viscosity of 1000 to 9000 cps at 25° C.

In another embodiment is disclosed a highly fluorinated silicone resin formed by a method comprising the steps of: a.) forming a monomer mixture by combining a M type monomer having a chlorosilane function; a first T type monomer having at least one fluoroalkane group; a second T type monomer having a (meth)acryloyl functional group; optionally, a D type monomer; and optionally, a Q type monomer in a solvent selected from the group consisting of diethyl either, methyl tert-butyl ether, diisopropyl ether, and mixtures thereof; b.) adding to the monomer mixture water in a dropwise fashion to form a reaction mixture; and c.) refluxing the reaction mixture for a period of time sufficient to form a highly fluorinated silicone resin having a fluorine content of at least 55 weight percent based on the total resin weight, an uncured viscosity at 25° C. of from 1000 to 9000 cps and a refractive index at 25° C. of less than 1.4.

In another embodiment is disclosed an optically clear adhesive comprising: a highly fluorinated silicone resin having a fluorine content of at least 55 weight percent based on the total weight; a photoinitiator; and, optionally, a highly fluorinated (meth)acrylate monomer or a perfluoro polyether, wherein the optically clear adhesive has a refractive index at 25° C. of less than 1.4.

The disclosed compounds include any and all isomers and stereoisomers. In general, unless otherwise explicitly stated the disclosed materials and processes may be alternately formulated to comprise, consist of, or consist essentially of, any appropriate components, moieties or steps herein disclosed. The disclosed materials and processes may additionally, or alternatively, be formulated so as to be devoid, or substantially free, of any components, materials, ingredients, adjuvants, moieties, species and steps used in the prior art compositions or that are otherwise not necessary to the achievement of the function and/or objective of the present disclosure.

When the word "about" is used herein it is meant that the amount or condition it modifies can vary some beyond the stated amount so long as the function and/or objective of the disclosure are realized. The skilled artisan understands that there is seldom time to fully explore the extent of any area and expects that the disclosed result might extend, at least somewhat, beyond one or more of the disclosed limits. Later, having the benefit of this disclosure and understanding the concept and embodiments disclosed herein, a person of ordinary skill can, without inventive effort, explore beyond the disclosed limits and, when embodiments are found to be without any unexpected characteristics, those embodiments are within the meaning of the term about as used herein.

These and other features and advantages of this disclosure will become more apparent to those skilled in the art from the detailed description of a preferred embodiment. The drawings that accompany the detailed description are described below.

BRIEF DESCRIPTION OF THE DRAWINGS

FIG. 1 is a graph showing the effect of the weight percentage of the MTQ silicone resin to fluoroacrylate monomer in the adhesive on the adhesive peel strength for two different substrate combinations.

DETAILED DESCRIPTION OF A PREFERRED EMBODIMENT

The present disclosure is directed toward liquid optically clear adhesives (LOCA) that comprise highly fluorinated radically crosslinkable silicone resins and that have very low refractive indexes. These resins can optionally be further combined with highly fluorinated acrylate monomers or perfluoro polyethers to further improve the low refractive index and high adhesive values. Optionally, an acrylamide can be added to further improve the adhesion strength of the LOCA depending on the substrates being bonded. The adhesives exhibit very low refractive index values and can be used as an adhesive to form improved liquid crystal modules with zero bezel space. The disclosed process of formation of the highly fluorinated radically crosslinkable silicone resins proceeds in a single step process unlike past multi-step processes for formation of silicone resins with fluorination. The resultant highly fluorinated silicone resin can be utilized as an effective LOCA for many substrates. Additionally, the disclosed highly fluorinated silicone resin can then, optionally, be combined with one or more of a fluoroacrylate monomer, a perfluoro polyether, an acrylamide and a photoinitiator to form a liquid optically clear adhesive having a very low refractive index and improved adhesive properties. The disclosed LOCA does not require the presence of other oligomeric species to reduce the volatility of the fluoroacrylate monomer and the highly fluorinated acrylate monomer does not reduce the adhesive value of the LOCA. This is in contrast to prior solutions involving addition of fluorinated acrylate monomers to silicone resins which in the past generally resulted in reduced adhesiveness of that conventional adhesive. The disclosed LOCA can be used at very low levels and in very thin layers and still provide sufficient adhesion, thus reducing the size and thickness of liquid crystal modules. Through use of the disclosed LOCA the bezel of a standard mobile phone screen can be reduced to zero providing a larger viewing area with no increase in overall screen size. The refractive index of the liquid LOCA and the cured reaction products of the LOCA is preferably less than 1.40, more preferably less than 1.37 and most preferably less than 1.36 at 589 nm. In the present specification and claims the terms "(meth)acryloyl" or "(meth)acrylate" are intended to include methacryloyl monomers and acryloyl monomers, and methacrylate monomers and acrylate monomers, respectively as understood by one of skill in the art. These include acrylic acid, methacrylic acid, and esters of each of these acids.

As discussed herein past methods for formation of highly fluorinated silicone resins typically proceed through a multi-step process wherein the first step is formation of the silicone resin through a sol/gel procedure. This results in a silicone resin with residual silanol groups in the resin. These groups are subsequently reacted with other reactants having fluorine containing groups to form the fluorinated silicone resin. This prior process is very difficult to control and hard to utilize to produce uniform products having a desired fluorination level. One is limited to the available residual silanol groups and their reactivity. The previous process requires solvent changes and a significant period of time.

The disclosed process of the present specification is a novel single step process whereby the fluorine groups are directly incorporated into the silicone resin during its initial formation. The disclosed sol/gel process for formation of the highly fluorinated silicone resin requires the use of very specific solvents selected from the group consisting of diethyl ether, methyl tert-butyl ether (MTBE), and diisopropyl ether. Use of solvents other than these three resulted in formation of a solid or at best suspensions of solid fluorosilicone resins which are not useful as liquid optically clear adhesives. As shown in the data below, common silicone resin solvents were unable to solvate the highly fluorinated silicone resins produced according to the present process. The preferred solvents, diethyl ether, methyl tert-butyl ether, and diisopropyl ether, are not those typically used in sol/gel processes for formation of silicone resins or fluorinated silicone resins, but are required for the formation of the disclosed fluorinated silicone resins. The formed highly fluorinated silicone resins are soluble in these specific solvents and this allows the sol/gel process to be used to incorporate the fluorine into the silicone resin in a single step. The appropriate solvent permits the reaction product to remain in solution and the solution to remain as a clear liquid during the reaction process.

The disclosed process for formation of the highly fluorinated silicone resin proceeds through a one-step condensation sol/gel process. The disclosed silicone resin is of the MTQ or MT variety and uses a combination of M, T, and preferably Q type silicon monomers. The disclosed silicone resin can optionally comprise D type silicon monomers. The M type monomers comprise at least one chlorosilane monomer, preferably one having a fluoroalkane group attached to the silicon atom, although it is not required. The addition of a fluoroalkane group allows for increased incorporation of fluorine, however it also raises the cost of the M type monomer and is not required. The fluoroalkane group preferably includes a hydrocarbon bridge segment connecting the silicon atom to the fluoroalkane portion. The length of the fluoroalkane segment, when present, can vary from one carbon atom to any desired length. The at least one chlorosilane has a preferred structure of $(R^1)_1(R^2)_2SiCl$: wherein $R^1$ can be a fluoroalkane group comprising $CF_3$—$(CF_2)_n$—$(CH_2)_m$— wherein n is an integer and has a value as desired of from 0 to any desired length and m is an integer, preferably between 1 and 3. The segment —$(CH_2)_m$— is the hydrocarbon bridge segment. Alternatively, as discussed $R^1$ can comprise any alkane including methyl and longer alkane groups. Preferably the $R^2$ groups are methyl groups or larger alkanes, two $R^2$ groups can be the same or different as desired. One example of such a M type fluoroalkane monomer is (tridecafluoro 1,1,2,2-tetrahydrooctyl)dimethylchlorosilane (TDFDMCLS). The M type monomer can be any chlorosilane including ones without a fluoroalkane function including, by way of example only, chlorotrimethylsilane, chlorotriethylsilane, or chlorotripropylsilane. The M type monomers are preferably present in the reaction mixture at a level of from 10 to 40 mole percentage, more preferably from 20 to 30 mole percentage, most preferably from 25 to 30 mole percentage based on the total moles of silicone monomers in the reaction mixture.

The T type monomers comprise at least one trialkoxy silane with a fluoroalkane group attached to the silicon atom, a T type fluoroalkane monomer. The trialkoxy silanes are preferably utilized over dialkoxy silanes because they are more reactive, however the dialkoxy silanes provide the possibility of utilizing a monomer having two fluoroalkane groups attached to the silicon atom to increase the fluorine incorporation. There are many examples of suitable T type fluoroalkane monomers meeting these requirements. The T type fluoroalkane monomers have a preferred structure of $(R^1)_1Si(R^3)_3$ wherein $R^1$ is a fluoroalkane group, as described above in the M type monomers; and wherein each $R^3$ is independently an alkoxy group. Preferably the alkoxy groups $R^3$ are all the same. Preferably the at least one trialkoxy silane with a fluoroalkane group is present in the reaction mixture in an amount of from 40 to 65 mole percentage, more preferably from 40 to 55 mole percentage, most preferably from 45 to 50 mole percentage based on the total moles of silicone monomers in the reaction mixture. The fluoroalkane segment can have any length desired, again the cost of the monomer increases with increasing length. The T type monomer can be used to provide the majority of the fluorine groups to the highly fluorinated silicone resin and thus it is preferably the majority by mole percentage of the monomers utilized in the reaction. A suitable T type monomer meeting these requirements includes, by way of example only, (tridecafluoro 1,1,2,2-tetrahydrooctyl)triethoxysilane (TDFTES).

In a preferred embodiment at least one Q type monomer is also utilized, although it is not required in the disclosed process. The preferred Q type monomer is at least one tetraalkoxy silane. Any tetraalkoxy silane is suitable in the disclosed process, one example includes tetraethyl orthosilicate (TEOS). As discussed the utilization of a Q type monomer is optional. The at least one tetraalkoxy silane has a preferred formula of $(R^3)_4Si$ wherein each $R^3$ is independently an alkoxy group. Preferably the alkoxy groups $R^3$ are all the same. Preferably, the at least one tetraalkoxy silane is present in an amount of from 0 to 30 mole percentage, more preferably from 5 to 25 mole percentage, and most preferably from 5 to 20 mole percentage based on the total moles of silicone monomers in the reaction mixture.

In some embodiments at least one D type silicone monomer can be used. Preferably, the at least one D type monomer is present in an amount of from 0 to 15 mole percentage, more preferably from 0 to 10 mole percentage, based on the total moles of silicone monomers in the reaction mixture.

The disclosed process also includes utilization of at least one T type monomer comprising a (meth)acryloyl trialkoxysilane. The (meth)acryloyl functional group provides the highly fluorinated silicone resin with cross-linking ability and is an aid in creating a suitable LOCA having the desired properties such as curability. These T type monomers are trialkoxy silanes including a (meth)acryloyl function joined to the silicon atom, usually through a linkage segment including an ester linkage to the (meth)acryloyl function as is provided by all (meth)acrylic esters such as methyl methacrylate or methyl acrylate. Suitable T type (meth)acryloyl functional monomers, by way of example only, include 3-(trimethoxysilyl)propyl methacrylate and 3-(trimethoxysilyl)propyl acrylate. The at least one trialkoxysilane with a (meth)acryloyl functional group preferably has a structure of $(R^4)_1(R^3)_3Si$ wherein the $R^4$ is the (meth)acryloyl functional group and the $R^3$ groups are independently alkoxy groups. The structure of the $R^4$ (meth)acryloyl functional group is preferably as follows: $(CH_2=CR^5)(C=O)-O-(CH_2)_n$— wherein $R^5$ is either H or $CH_3$— and n is an integer with a value of at least 1. Preferably the at least one trialkoxysilane with a (meth)acryloyl functional group is present in an amount of from 2.5 to 40 mole percentage, more preferably 2.5 to 30 mole percentage, even more preferably from 5 to 20 mole percentage, and most preferably from 10 to 20 mole percentage based on the total moles of monomer in the reaction.

The disclosed sol/gel formation process is carried out in a solvent selected from the aforementioned group. The solvent and all of the selected silicone monomers are combined together, and then an excess of water is added to the mixture dropwise for the first 5 minutes. After addition of the water the mixture is then refluxing for a sufficient time to create a highly fluorinated silicone resin having a viscosity of from 1000 to 9000 cps, and more preferably from 2000 to 6000 cps. The viscosity is measured at 25° C. using a cone and plate process 1/s=30. Generally, this reflux time ranges from about 2 hours to about 3.5 hours. The actual reflux temperature is dependent on the specific solvent chosen for the sol/gel procedure as known to those of skill in the art and generally ranges from 45 to 60° C. The solvent is typically used in an amount of from 14 to 30 weight percentage based on the total weight of all monomers, solvent and added water. The amount of water added is equal to at least the amount required for a theoretical complete hydrolysis of all of the alkoxy groups in the reaction mixture, typically in the range of from 7 to 10 weight percent based on the total weight of all the monomers, solvent and added water. As the reaction proceeds it also generates additional water. The most reactive monomers are the M type and they react first to produce HCl, which acts as a further catalyst for the condensation reaction.

The resulting reaction product, the highly fluorinated silicone resin, is then typically worked up by an initial liquid/liquid separation, optionally followed by a water wash. The collected liquid is then neutralized with $NaHCO_3$; dried, preferably over $Na_2SO_4$; filtered; optionally washed with acetone to remove impurities; and then vacuum stripped to remove the acetone and to recover the liquid highly fluorinated silicone resin.

The disclosed one-step process results in formation of a highly fluorinated silicone resin that can be radically cross-linked and cured through the (meth)acryloyl functional groups incorporated into the resin. The produced highly fluorinated silicone resins are liquid until cured and have suitable viscosities, measured as described herein, for use in LOCA, preferably in the range of 1000 to 9000 cps, more preferably from 2000 to 6000 cps. Preferably, the disclosed resins and cured reaction product produced using them have refractive index values at 589 nanometers and 25° C. of 1.40 or less, more preferably 1.37 or less, and most preferably 1.36 or less. These values refer to both the liquid resin and the cured resin refractive index values. The resin can be combined with known photoinitiators and cured using UV light into an effective adhesive meeting the requirements of a LOCA. The useful photoinitiators include those known in the art to initiate curing of (meth)acrylate functional groups and include, by way of example only: benzoin, substituted benzoins, benzophenone, Michler's ketone, dialkoxyacetophenones like diethoxyacetophenone (DEAP), and bis(2,4,6-trimethylbenzoyl)-phenylphosphinoxide. The photoinitiators are generally used at a level of from 0.01 to 5% by weight based on total adhesive weight. The cure is generally affected using a suitable UV lamp as known to those of skill in the art. In a preferred embodiment the photoinitiator used is one that can be activated by visible light to reduce the heat generated during cure and to increase the cure depth.

The highly fluorinated silicone resins produced according to the present disclosure have low refractive indexes due to the high level of fluorine in the structure. As discussed above, optional addition of fluorinated (meth)acrylate monomers or perfluoro polyethers to the highly fluorinated silicone resins can be used to further lower the refractive index of the LOCA. The inclusion of the fluoro(meth)acrylate monomers further improves the adhesive qualities of the disclosed highly fluorinated silicone resin. The process according to the present disclosure comprises combining the highly fluorinated silicone resin with a fluorocarbon ester of a (meth)acrylate or a perfluoro polyether. Examples of fluorocarbon esters of a (meth)acrylate include simple fluorocarbon esters such as 1,1,1,3,3,3, hexafluoroisopropyl acrylate to more highly fluorinated compounds such as 3,3,4,4,5,5,6,6,7,7,8,8,8-tridecafluorooctyl acrylate. Preferably the fluorocarbon esters of a (meth)acrylate are present in an amount of from 20 to 90 weight percent, and more preferably from 40 to 80 weight percent based on the total weight of the adhesive. Addition of a photoinitiator, as discussed above allows the combination of highly fluorinated silicone resin and highly fluorinated (meth)acrylate monomer to be cured. The addition of the fluorocarbon ester of a (meth)acrylate to the highly fluorinated silicone resin at the preferred levels produces an adhesive with a significantly lower viscosity in the range of from 60 centipoise or less at 25° C. This is highly advantageous for a LOCA, the low viscosity means it is easy to apply and spread over surfaces allowing for thinner designs. The cured adhesives exhibit only slightly higher refractive indexes than the uncured LOCA. As known to those of skill in the art perfluoro polyethers are also known as perfluoroalkylethers and they have a variety of structures, all of which find use in the present invention. In the art these are known commonly as perfluoroalkylethers, (PFAE), perfluoropolyether (PFPE), or perfluoropolyalkylether (PFPAE). Some of the known structures include: $F—(CF(CF_3)—CF_2—O—)_n—CF_2CF_3$ wherein n ranges from 10 to 60, commonly called hydrofluoroethylene (HEPO); or $CF_3—(O—(CF_2CF_2)_p—(O—CF_2)_q—OCF_3$ wherein p/q<0.8, commonly called tetrafluoroethylene (TFE); or $F—((CF_2)_3—O)_n—CF_2—CF_3$, wherein n is from 10 to 60, commonly called perfluorotrimethyleneoxide (PFTMO). These perfluoro polyethers can be used at levels of from 0 to 30 weight percentage based on the total weight of the adhesive.

In some uses it is also preferably to include an adhesive improving additive in the adhesive in addition to the highly fluorinated silicone resin and highly fluorinated (meth)acrylate monomer or perfluoro polyether to improve the adhesive qualities. Examples of suitable adhesive improving additives include: alkyl acrylamides; vinylpyrrolidone; N-acryloylmorpholine; acrylic acid; beta-carboxyethyl acrylate; octyl trimethoxysilane, commercially available from Chemtura under the trade designation A-137; glycidyl trimethoxysilane, commercially available from Chemtura under the trade designation A-187; methacryloxypropyl trimethoxysilane, commercially available from Chemtura under the trade designation of A-174; vinyl trimethoxysilane; tetraethoxysilane and its partial condensation products; fluorinated alkoxysilanes, such as by way of example only, nonafluorohexyl triethoxy silane, trifluoropropyl trimethoxy silane, and tridecafluorooctyl triethoxysilane; and combinations thereof of these examples. The alkyl acrylamides are especially useful when the LOCA is used to bond two plastic materials to each other and less useful when one is bonding a plastic to a glass or two glass layers together. The preferred alkyl acrylamides have the structure of $CH_2=CR^5—(C=O)—N(R^7)_2$ wherein $R^5$ is either H or $CH_3$ and each $R^7$ is independently an alkane of $C_1$ to $C_4$. The adhesive improving additive is preferably present in an amount of from 0 to 3 weight percent, more preferably from 0.5 to 3.0 weight percent based on the total adhesive weight. The same photoinitiators as discussed above find use in the adhesive with these adhesive improving additives as cure agents and can be used at the same levels.

Testing Methods

In the present disclosure the resins and cured resins were tested using the processes as described below. The viscosities were measured using a Brookfield Cone/Plate viscometer set to 1/s=30 at 25° C. and are reported in Centipoise (cps). The refractive index of the samples was measured using a Metricon Model 2010/M prism coupler refractometer. The peel test data was generated as follows: polycarbonate, polyacrylate and polyester films were cut into 25 mm wide strips. Two strips were selected as desired to form the test substrates. The two strips were laminated using the test adhesive composition. The adhesive thickness varied from about 50 to 150 microns in thickness. The laminated samples were then UV cured using an H bulb at an energy of UVA 0.165 mv/cm² for 60 seconds. The peel strength was then measured. Just prior to the peel strength test the samples were stored in an environment of 50% humidity at 23° C. for at least 30 minutes. The actual peel test was done utilizing a Cheminstruments 180° peel adhesive testing machine, Fairfield Ohio, at a peel speed of 12 inches/minute.

Examples of Highly Fluorinated Silicone Resins

The monomer components listed in Table 1 below were combined, the values being mole percentage based on the total moles of monomer in the reaction mixture, as described above in the solvent MTBE and the appropriate amount of water was added dropwise followed by reflux for 2 to 3 hours at 60° C. to produce the highly fluorinated silicone resins. The resins were worked up as described herein and after stripping used as further described herein. The abbreviations for the monomers are as follows: (tridecafluoro 1,1,2,2-tetrahydrooctyl)dimethylchlorosilane (TDFDMCLS); (tridecafluoro 1,1,2,2-tetrahydrooctyl)triethoxysilane (TDFTES); 3-(trimethoxysilyl)propyl acrylate (AOPTMS); and tetraethyl orthosilicate (TEOS). The resin made with 0 mole % AOPTMS is not UV light curable as would be known to those of skill in the art.

TABLE 1

| Resin Formula | TDFDMCLS Mole % | TDFTES Mole % | AOPTMS Mole % | TEOS Mole % | Theoretical fluorine content weight % |
|---|---|---|---|---|---|
| 1 | 30.0 | 50.0 | 0.0 | 20.0 | 62.0 |
| 2 | 30.0 | 47.5 | 2.5 | 20.0 | 59.3 |
| 3 | 30.0 | 45.0 | 5.0 | 20.0 | 59.0 |
| 4 | 30.0 | 42.5 | 10.0 | 17.5 | 57.3 |
| 5 | 27.5 | 42.5 | 15.0 | 15.0 | 56.2 |
| 6 | 25.0 | 42.5 | 20.0 | 12.5 | 55.2 |

A series of resins as described above in TABLE 1 were prepared and then their liquid, uncured refractive indexes were measured, the results are presented below in TABLE 2 as the raw data and the average for each level of AOPTMS. The results show that as the level of T type monomer having a (meth)acrylate function increases, so does the refractive index of the resin. All of the prepared resins had refractive index values below 1.3600, and most were below 1.3550.

TABLE 2

| Resin Formula | Liquid uncured Refractive Index | Average for given level of AOPTMS |
|---|---|---|
| 1 | 1.3459 | NA |
| 2 | 1.3468 | |
| 2 | 1.3473 | |
| 2 | 1.3468 | 1.3470 |
| 3 | 1.3506 | |
| 3 | 1.3493 | 1.3499 |
| 4 | 1.3522 | |
| 4 | 1.3530 | |
| 4 | 1.3526 | 1.3526 |
| 5 | 1.3536 | |
| 5 | 1.3546 | 1.3541 |
| 6 | 1.3570 | |
| 6 | 1.3561 | |
| 6 | 1.3582 | 1.3571 |

The solubility of highly fluorinated silicone resins prepared according to the present disclosure were tested in a variety of common silicone resin solvents to determine if any of the common silicone resin solvents provided the level of solubility as achieved in diethyl ether, MTBE, or diisopropyl ether. Two highly fluorinated resins were prepared as described herein using the monomer combinations shown in TABLE 3 below, the (meth)acrylate functional T type monomer used in these experiments was 3-(trimethoxysilyl)propyl methacrylate (MAOPTMS). The resins were mixed with the solvents at weight/weight ratios of solvent to resin of from 2:1 to 5:1. If after mixing the mixture became totally miscible and optically clear, then the resin was deemed soluble in the solvent. If after mixing the mixture seemed miscible despite some haze then it was deemed partially soluble in the solvent. If after mixing the mixtures quickly separated and each was optically clear then the resin was deemed insoluble in the solvent.

TABLE 3

| Resin Formula # | TDFDMCLS Mole % | TDFTES Mole % | MAOPTMS Mole % | TEOS Mole % |
|---|---|---|---|---|
| 7 | 30.0 | 45.0 | 5.0 | 20.0 |
| 8 | 30.0 | 47.5 | 2.5 | 20.0 |

The results for resin 7 are shown in TABLE 4 below, other diisopropyl ether and diethyl ether the resin was not soluble in any of the other solvents tested.

TABLE 4

| Solvent | Soluble (yes or no) |
|---|---|
| Diethyl ether | Yes |
| Diisopropyl ether | Yes |
| Acetone | No |
| Acetonitrile | No |
| Ethylacetate | No |
| Dimethylsulfoxide | No |
| NN dimethylacetamide | No |
| Tetrahydrofuran | No |
| Cyclohexane | No |
| Heptane | No |

Similar results were obtained with resin 8 as shown below in TABLE 5, again the only solvents the resin was soluble in were diethyl ether, MTBE and diisopropyl ether.

TABLE 5

| Solvent | Solvent/Resin wgt/wgt ratio | Soluble (yes or no) |
|---|---|---|
| Diethyl ether | 10/1 | Yes |
| MTBE | 10/1 | Yes |
| Diisopropyl ether | 10/1 | Yes |
| Cyclopentyl methyl ether | 10/1 | No |
| Di(propylene glycol) methyl ether | 10/1 | No |
| Toluene | 10/1 | No |
| Tetrahydrofuran | 10/1 | No |
| n-Butylchloride | 10/1 | No |
| Dimethylformamide | 10/1 | No |
| Ethyl acetate | 10/1 | No |

A set of highly fluorinated silicone resins were prepared using the monomers in the ratios shown in TABLE 6 below. These highly fluorinated resins were then combined in the weight percentage amounts with a photoinitiator, a highly fluorinated (meth)acrylate monomer and optionally an acrylamide to form LOCA compositions A-I as shown below in TABLE 7. These were then further tested as described below. The abbreviations for the monomers are as follows: (tridecafluoro 1,1,2,2-tetrahydrooctyl)dimethylchlorosilane (TDFDMCLS); (tridecafluoro 1,1,2,2-tetrahydrooctyl)triethoxysilane (TDFTES); 3-(trimethoxysilyl)propyl acrylate (AOPTMS); 3-(trimethoxysilyl)propyl methacrylate (MAOPTMS) and tetraethyl orthosilicate (TEOS). The MAOPTMS was only used with resin 7, all of the rest used AOPTMS. The photoinitiator used was bis(2,4,6-trimethylbenzoyl)-phenylphosphinoxide.

TABLE 6

| Resin # | TDFDMCLS Mole % | TDFTES Mole % | AOPTMS or MAOPTMS Mole % | TEOS Mole % |
|---|---|---|---|---|
| 7 | 30.0 | 45.0 | 5.0 | 20.0 |
| 9 | 30.0 | 47.5 | 2.5 | 20.0 |
| 10 | 30.0 | 47.5 | 2.5 | 20.0 |

TABLE 6-continued

| Resin # | TDFDMCLS Mole % | TDFTES Mole % | AOPTMS or MAOPTMS Mole % | TEOS Mole % |
|---|---|---|---|---|
| 11 | 30.0 | 45.0 | 5.0 | 20.0 |
| 12 | 25 | 70 | 5.0 | 0.0 |
| 13 | 30.0 | 45.0 | 5.0 | 20.0 |
| 14 | 25.0 | 42.5 | 20.0 | 12.5 |

TABLE 7

| Composition | A | B | C | D | E | F | G | H | I |
|---|---|---|---|---|---|---|---|---|---|
| Resin 7 | | | | | | | | 71.0 | |
| Resin 9 | | | | | | | | | 71.0 |
| Resin 10 | 50.2 | | | | | | | | |
| Resin 11 | | 49.5 | 48.0 | | | | | | |
| Resin 12 | | | | 49.2 | 48.0 | | | | |
| Resin 13 | | | | | | 48.4 | | | |
| Resin 14 | | | | | | | 48.4 | | |
| Photoinitiator | 1.05 | 1.0 | 1.0 | 1.0 | 1.1 | 0.2 | 0.2 | 0.75 | 0.75 |
| NN Dimethylacrylamide | | | 3.0 | | 2.9 | 3.0 | 3.0 | | |
| 1H,1H,2H,2H perfluorooctyl Acrylate | 48.75 | 49.5 | 48.0 | 49.8 | 48.0 | 48.4 | 48.4 | | |
| 1,1,1,3,3,3 hexafluoroisopropyl acrylate | | | | | | | | 28.25 | 28.25 |

The final compositions were tested for refractive index in the liquid and cured states. The results of these tests are reported below in TABLE 8. In general one sees that the refractive index increases slightly as the resin is cured.

TABLE 8

| composition | Liquid Refractive Index | Cured Refractive Index |
|---|---|---|
| A | 1.3413 | 1.3568 |
| B | 1.3424 | 1.3567 |
| C | 1.3477 | 1.3582 |
| D | | 1.3538 |
| E | | 1.3590 |
| F | 1.3424 | 1.3570 |
| G | 1.3634 | 1.3485 |
| H | 1.3423 | |
| I | 1.3385 | |

The adhesive qualities of the highly fluorinated silicone resin are dramatically affected by the presence of the highly fluorinated (meth)acrylate monomer. This is demonstrated in the results shown in FIG. 1 and TABLE 11, which show the peel strength of various combinations of MTQ resin with 1H,1H,2H,2H perfluorooctyl acrylate and a variety of substrates. The MTQ highly fluorinated silicone resins had the monomer compositions shown in TABLE 9 using the abbreviations herein, the adhesive compositions were as shown in TABLE 10. In addition to the MTQ resin and the 1H,1H,2H,2H perfluorooctyl acrylate, the adhesive compositions included 0.1 weight % of the photoinitiator bis(2,4,6-trimethylbenzoyl)-phenylphosphinoxide and 3 weight % of N,N dimethylacrylamide based on the total adhesive weight. The ratios of MTQ to 1H,1H,2H,2H perfluorooctyl acrylate are based on the total weight of the two combined as shown in TABLE 10. The actual results of the peel tests, reported in oz./inch are shown in TABLE 11. The results of FIG. 1 demonstrate that for plastic substrates such as the polycarbonate (PC) to polyacrylate (PA) and the polyacrylate (PA) to polyester (PE) the addition of the perfluooctylacrylate increases the adhesive qualities in the range of 20 to 80% by weight for both a MTQ resin having 2.5 mole % acrylate and one having 5 mole % acrylate. The results also show that the optimum level is dependent on the substrates being joined together and the level of acrylate in the MTQ resin. For example, joining polycarbonate to polyacrylate substrates, lines 1 and 3 in FIG. 1, the effect of the 1H,1H,2H,2H perfluorooctyl acrylate was seen starting at slightly over 20 weight percentage and it peaked at about 50 weight percentage. The shape of the curve was sharper than for joining polyacrylate to polyester substrates, lines 2 and 4 in FIG. 1. In fact, the two highest levels of 1H,1H,2H,2H perfluorooctyl acrylate resulted in no joining of polycarbonate to polyacrylate as shown in lines 1 and 3 of FIG. 1. By way of contrast when joining polyacrylate to polyester the effect of the 1H,1H,2H,2H perfluorooctyl acrylate was more significant in terms of actual adhesive strength and the curves were much broader. The 1H,1H,2H,2H perfluorooctyl acrylate was capable of joining polyacrylate to polyester even in the absence of the MTQ resin as shown in lines 2 and 4.

TABLE 9

| Component in MTQ resin | 2.5 mole % AOPTMS | 5.0 mole % AOPTMS |
|---|---|---|
| TDFDMCLS | 30 | 30 |
| TDFTES | 47.5 | 45 |
| AOPTMS | 2.5 | 5 |
| TEOS | 20 | 20 |

TABLE 10

| MTQ resin weight % | 1H,1H,2H,2H perfluorooctyl Acrylate weight % |
|---|---|
| 0.0 | 100.0 |
| 10.0 | 90.0 |
| 25.0 | 75.0 |
| 50.0 | 50.0 |
| 75.0 | 25.0 |
| 100.0 | 0.0 |

TABLE 11

| Weight % MTQ resin | 2.5 mole % AOPTMS | | 5.0 mole % AOPTMS | |
|---|---|---|---|---|
| | PC to PA Line 1 peel strength oz./inch | PA to PE Line 2 peel strength oz./inch | PC to PA Line 3 peel strength oz./inch | PA to PE Line 4 peel strength oz./inch |
| 0 | 0.32 | 7.99 | 0.32 | 7.99 |
| 10 | 0.27 | 18.36 | | |
| 25 | 10.14 | 25.49 | | |
| 50 | 19.17 | 23.37 | 15.2 | 14.12 |
| 75 | 8.7 | 7.85 | | |
| 100 | 0.29 | 0.47 | 0.33 | 0.64 |

In another test, MTQ resin 13 was combined with 1H,1H,2H,2H perfluorooctyl acrylate as shown in the final adhesive formula F from TABLE 7 and then it was used to adhere a substrate of polyethylene terephthalate (PET) to glass. The peel strength value that was measured was 6.3 oz./inch.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

We claim:

1. A highly fluorinated silicone resin comprising the reaction products of:
   an M type monomer having a chlorosilane function; a first T type monomer having at least one fluoroalkane group; a second T type monomer having a (meth) acryloyl functional group; optionally, a D type monomer; and optionally, a Q type monomer;
   said silicone resin having a fluorine content of at least 55 weight percent based on the total weight, a refractive index at 25° C. of less than 1.4, and an uncured viscosity of 1000 to 9000 cps at 25° C.

2. The highly fluorinated silicone resin according to claim 1, wherein said M type monomer further includes at least one fluoroalkane group.

3. The highly fluorinated silicone resin according to claim 1, wherein said first T type monomer and said second T type monomer are trialkoxy silane monomers.

4. The highly fluorinated silicone resin according to claim 1, wherein said resin comprises the reaction products of 10 to 40 mole percentage of said M type monomer; 40 to 65 mole percentage of said first T type monomer; 2.5 to 40 mole percentage of said second T type monomer different from the first T type monomer; 0 to 15 mole percentage of said D type monomer; and 0 to 30 mole percentage of said Q type monomer, wherein the total mole percentage is 100.

5. The highly fluorinated silicone resin according to claim 1, wherein said Q type monomer is present in said silicone resin.

6. The highly fluorinated silicone resin according to claim 1, wherein said silicone resin has a fluorine content of at least 60 weight percent based on the total weight.

7. The highly fluorinated silicone resin according to claim 1, wherein said silicone resin has a refractive index at 25° C. of less than 1.36.

8. The highly fluorinated silicone resin according to claim 1, wherein said silicone resin has an uncured viscosity at 25° C. of from 2000 to 6000.

9. Cured reaction products of the highly fluorinated silicone resin according to claim 1.

10. The highly fluorinated silicone resin of claim 1 formed by a method comprising the steps of:
   a.) forming a monomer mixture by combining a M type monomer having a chlorosilane function; a first T type monomer having at least one fluoroalkane group; a second T type monomer having a (meth)acryloyl functional group; optionally, a D type monomer; and optionally, a Q type monomer in a solvent selected from the group consisting of diethyl either, methyl tert-butyl ether, diisopropyl ether, and mixtures thereof;
   b.) adding to the monomer mixture water in a dropwise fashion to form a reaction mixture; and
   c.) refluxing the reaction mixture for a period of time sufficient to form a highly fluorinated silicone resin having a fluorine content of at least 55 weight percent based on the total resin weight, an uncured viscosity at 25° C. of from 1000 to 9000 cps and a refractive index at 25° C. of less than 1.4.

11. The method of forming a highly fluorinated silicone according to claim 10, wherein step a.) further comprises combining from 10 to 40 mole percent of the M type monomer; 40 to 65 mole percent of the first T type monomer; 2.5 to 40 mole percent of the second T type monomer; 0 to 15 mole percent of the D type monomer; and 0 to 30 mole percent of the Q type monomer, wherein the total mole percentage is 100.

12. The method of forming a highly fluorinated silicone according to claim 10, wherein the Q type monomer is present in step a.).

13. The method of forming a highly fluorinated silicone according to claim 10, wherein step b.) comprises adding an excess amount of water based on the total number of hydrolyzable groups found in the monomer mixture.

14. The method of forming a highly fluorinated silicone according to claim 10, wherein step a.) comprises selecting as the solvent methyl tert-butyl ether.

15. The method of forming a highly fluorinated silicone according to claim 10, wherein step c.) comprises refluxing the reaction mixture at a temperature of from 40 to 65° C. for a period of time of from 2 hours to 4 hours.

16. An optically clear adhesive comprising:
   The highly fluorinated silicone resin of claim 1;
   a photoinitiator; and
   optionally a fluorinated (meth)acrylate monomer or a perfluoro polyether, wherein said optically clear adhesive has a refractive index at 25° C. of less than 1.4.

17. The optically clear adhesive of claim 16 wherein said highly fluorinated silicone resin has a fluorine content of at least 60 weight percent based on the total weight of the silicone resin.

18. The liquid optically clear adhesive of claim 16 wherein said fluorinated (meth)acrylate monomer or a perfluoro polyether is present in an amount of from 90 to 20 weight percent based on the total weight of the adhesive.

19. The liquid optically clear adhesive of claim 16 further comprising an adhesive improving additive, said adhesive improving additive present in an amount of from 0.5 to 3.0 weight percent based on the total weight of the adhesive.

20. Cured reaction products of the optically clear adhesive of claim 16.

* * * * *